(12) United States Patent
Esnard et al.

(10) Patent No.: US 8,084,999 B2
(45) Date of Patent: Dec. 27, 2011

(54) METHOD FOR CHARGING LITHIUM BATTERIES WITH POWER DISSIPATION CONTROL

(75) Inventors: Domitille Esnard, Biot (FR); John Walley, Ladera Ranch, CA (US)

(73) Assignee: Broadcom Corporation, Irvine, CA (US)

(*) Notice: Subject to any disclaimer, the term of this patent is extended or adjusted under 35 U.S.C. 154(b) by 373 days.

(21) Appl. No.: 12/476,695

(22) Filed: Jun. 2, 2009

(65) Prior Publication Data

US 2010/0301813 A1 Dec. 2, 2010

(51) Int. Cl.
*H02J 7/04* (2006.01)
*H02J 7/16* (2006.01)
(52) U.S. Cl. .......................... 320/136; 320/162; 320/164
(58) Field of Classification Search .................. 320/136, 320/162, 164
See application file for complete search history.

(56) References Cited

U.S. PATENT DOCUMENTS

| 4,897,591 A * | 1/1990 | Spani ............................. 320/164 |
| 6,850,040 B2 * | 2/2005 | Xiong et al. ................... 320/134 |
| 2008/0094037 A1 * | 4/2008 | Enjalbert et al. .............. 320/162 |

* cited by examiner

*Primary Examiner* — Reena Aurora
(74) *Attorney, Agent, or Firm* — Thomas, Kayden, Horstemeyer & Risley, LLP

(57) ABSTRACT

Herein described are at least methods and systems to control power dissipation while charging a device. In a representative embodiment, the method comprises first monitoring a first voltage output by a charger used for said charging a battery of a device, second monitoring a second voltage at the battery, first determining a first current based on a power dissipation value associated with the device, the first voltage, and the second voltage, second determining a minimum of the first current and a second current, wherein the second current equals the maximum charging current during a typical charge cycle of the device, and applying a control signal to a control circuit to generate the minimum, wherein the control circuit is communicatively coupled to the charger at a first port, and the battery at a second port. An exemplary system comprises one or more circuits operable for, at least performing the aforementioned method.

31 Claims, 4 Drawing Sheets

METHOD FOR CHARGING LITHIUM BATTERIES WITH POWER DISSIPATION CONTROL

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Rechargeable batteries may be used to power electronic devices. When charging such batteries, these electronic devices may dissipate considerable heat. For example, a user may wish to charge a wireless headset while speaking to someone using the wireless headset. However, the user may find that the wireless headset generates substantial heat when the wireless headset is being charged, which may be uncomfortable to the user's ear.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a method and a system of controlling the power dissipation produced by a device when its battery is charged. The various aspects and representative embodiments of the method and system are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention can be found in a method and a system of controlling the power dissipated by a device while charging one or more rechargeable batteries in the device. The device uses rechargeable batteries such as lithium-ion or lithium-polymer batteries. In a representative embodiment, the device may comprise a device such as a headset. The headset may comprise a Bluetooth headset, for example. The device may comprise a handheld wireless device such as a cellular phone or personal digital assistant (PDA), or MP3 player, for example. Use of the method and system provides a controlled charging of the device to control and to reduce the heat dissipated by the device.

Various aspects of the invention facilitate controlled power dissipation of a device during the charging process. This allows a user to more comfortably use the device while the device is being charged. The various aspects of the invention provide a method to control power dissipation as well as improve the charging performance. By employing the various aspects of the invention, the overall charge time may be reduced in comparison to typical linear charging methods. Thus, a user of the device will realize faster charging times while being able to use the device comfortably. Thus, a wireless headset user may be able to comfortably conduct conversations while charging his headset quicker. In addition, controlling the power dissipation leads to improved safety. When a device reaches a certain power dissipation, the device's temperature may exceed a temperature safety threshold associated with the battery, which may result in damage to the battery, its device, and possible injury to the user. Furthermore, the performance of one or more components in a charge control circuitry of the device, for example, may be negatively affected as power dissipation increases. However, these negative effects may be alleviated by way of controlling the power dissipation.

Figure 1:
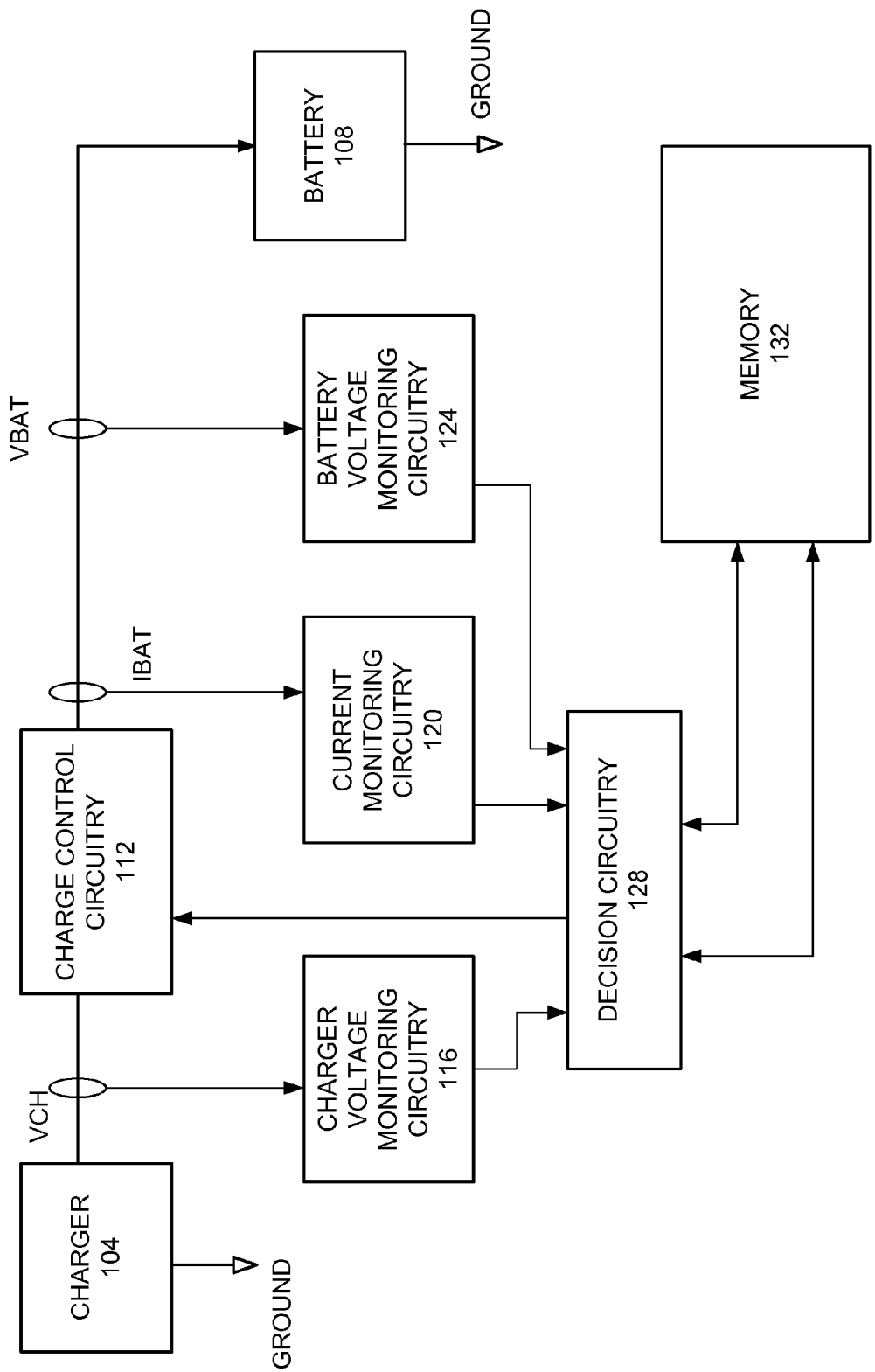
FIG. 1 is a system block diagram for performing controlled charging of a battery in a device, in accordance with an embodiment of the invention.

FIG. 1 is a system block diagram for performing controlled charging of a battery in a device, in accordance with an embodiment of the invention. As previously mentioned, the device may comprise a handheld wireless device such as a cellular phone, PDA, or headset, for example. The system comprises a charger 104, a battery 108, charge control circuitry 112, charger voltage monitoring circuitry 116, current monitoring circuitry 120, battery voltage monitoring circuitry 124, decision circuitry 128, and a memory 132. The charger 104 outputs a voltage, $V_{CH}$, sufficient to charge the battery 108 such that the battery 108 becomes fully charged. For example, the charger 104 may deliver an output $V_{CH}$ having an exemplary value, 5.0 volts, to a device communicatively coupled through an interface such as a USB (universal serial bus) type of interface, such that the battery 108 becomes charged. In a representative embodiment, a battery voltage of the battery 108, $V_{BAT}$, may attain a value 4.2V when fully charged. As illustrated, the charger 104 connects to the charge control circuitry 112. The charge control circuitry 112 is used to regulate the current provided by the charger 104 such that a controlled battery current, $I_{BAT}$, is provided to the battery 108. Furthermore, as shown, the charge control circuitry 112 connects to the battery 108 to provide the controlled battery current, $I_{BAT}$, used to charge the battery 108. The charge control circuitry 112 receives a control signal from the decision circuitry 128. The control signal is used for generating the controlled battery current, $I_{BAT}$, provided to the battery 108. The controlled battery current, $I_{BAT}$, is transmitted through the charge control circuitry 112 to the battery 108. As illustrated in FIG. 1, the charger voltage monitoring circuitry 116 monitors the charger voltage, $V_{CH}$, provided by the charger 104 by way of tapping the charger voltage, $V_{CH}$, between the charger 104 and the charge control circuitry 112. Likewise, the current monitoring circuitry 120 monitors the controlled battery current, $I_{BAT}$, provided by the charger 104 by way of tapping the controlled battery current, $I_{BAT}$, between the charge control circuitry 112 and the battery 108. As shown, the battery voltage monitoring circuitry 124 monitors the battery voltage, $V_{BAT}$, at the positive terminal of the battery 108. This can be accomplished by tapping the battery voltage, $V_{BAT}$, between the charge control circuitry 112 and the battery 108, as shown in FIG. 1. The decision circuitry 128 receives inputs from the charger voltage monitoring circuitry 116, the current monitoring circuitry 120, and the battery voltage monitoring circuitry 124. The charger voltage monitoring circuitry 116 may transmit a value associated with the charger voltage, $V_{CH}$, to the decision circuitry 128. Alternatively, the charger voltage monitoring circuitry 116 may generate and transmit a signal to the decision circuitry 128 that is proportional to the charger voltage, $V_{CH}$. The current monitoring circuitry 120 may monitor the controlled battery current, $I_{BAT}$, at the output of the charge control circuitry 112. The current monitoring circuitry 120 may transmit the value of the controlled battery current to the decision circuitry 128. Alternatively, the current monitoring circuitry 120 may generate and transmit a signal to the decision circuitry 128 that is proportional to the controlled battery current, $I_{BAT}$. The battery voltage monitoring circuitry 124 may monitor the battery voltage, $V_{BAT}$, and transmit an associated value to the decision circuitry 128. Alternatively, the battery voltage monitoring circuitry 124 may generate and transmit a signal to the decision circuitry 128 that is proportional to the battery voltage, $V_{BAT}$.

Based on using the values provided by the charger voltage monitoring circuitry 116, the current monitoring circuitry 120, and the battery voltage monitoring circuitry 124, the decision circuitry 128 outputs a control signal to the charge control circuitry 112, as shown. The control signal may be used to vary the battery current provided by the charger 104 such that a controlled battery current, $I_{BAT}$, is delivered to the battery 108 from the charge control circuitry 112. In a representative embodiment, the charge control circuitry 112 may comprise a pass transistor in which the base current of the pass transistor may be varied by way of using the control signal provided by the decision circuitry 128. As a consequence, the pass transistor may be used to pass the appropriately controlled battery current, $I_{BAT}$, to the battery 108 based on the amount of base current supplied to the pass transistor. The charge control circuitry 112 may comprise one or more types of analog circuits for using the control signal to effectively control the battery current, $I_{BAT}$, provided by the charger 104. The charger voltage monitoring circuitry 116, the current monitoring circuitry 120, and the battery voltage monitoring circuitry 124 may each comprise one or more analog circuits, an analog to digital converter (ADC), and one or more digital circuits. The decision circuitry 128 may comprise one or more digital circuits and/or firmware that generates the control signal used for generating the controlled battery current, $I_{BAT}$, as defined by the following equation:

$$I_{BAT} = MIN(I_{BAT\_MAX}, P_{MAX}/(V_{CH}-V_{BAT})). \text{ (controlled battery current equation)}$$

Thus, based on this equation, $I_{BAT}$, is equal to the minimum of a first current, $I_{BAT\_MAX}$, and a second current, $P_{MAX}/$ ($V_{CH}-V_{BAT}$). The decision circuitry 128 may perform computation of the foregoing equation in order to generate the appropriate control signal to the charge control circuitry 112. The charge control circuitry 112 generates the current, $I_{BAT}$, as defined by the foregoing equation, when the control signal is applied to the charge control circuitry 112. As shown in FIG. 1, $I_{BAT}$ is the current provided to the battery 108. In a representative embodiment, the decision circuitry 128 may generate a control signal that is proportional to $I_{BAT}$, as defined by the controlled battery current equation.

The foregoing equation defines that the controlled battery current, $I_{BAT}$, is equal to the minimum of $I_{BAT\_MAX}$ and $P_{MAX}/$ ($V_{CH}-V_{BAT}$). $I_{BAT\_MAX}$ is defined to be the value of the maximum current during a constant current phase of a typical charge cycle of the device's battery. Alternatively, $I_{BAT\_MAX}$, may be defined to be the maximum charging current during a typical charge cycle of the device's battery. Typically, the maximum charging current occurs during the constant current phase of a charge cycle of a charge depleted battery. The charge cycle may start with a precharge phase where the current ramps up. The precharge phase is followed by the constant current phase. The constant current phase is followed by a constant voltage phase. In the foregoing equation, $P_{MAX}$, represents a maximum power dissipation. In a representative embodiment, $P_{MAX}$ corresponds to the maximum power dissipation tolerated by the device. $P_{MAX}$ may be specified by a manufacturer of the device, for example. Likewise, $I_{BAT\_MAX}$ may be specified by the manufacturer of the device and/or a manufacturer of the battery. The values for $I_{BAT\_MAX}$ and $P_{MAX}$ may be stored in the memory 132. These values may be stored at the time the device is manufactured by the device manufacturer, for example. As shown in FIG. 1, the memory 132 communicates with the decision circuitry 128. The memory 132 provides the values for $I_{BAT\_MAX}$ and $P_{MAX}$ such that the decision circuitry 128 may compute $I_{BAT}$ according to the previously described controlled battery current equation.

In a representative embodiment, the charge control circuitry 112, the charger voltage monitoring circuitry 116, the current monitoring circuitry 120, the battery voltage monitoring circuitry 124, the decision circuitry 128, and optionally the memory 132, may be implemented using a single integrated circuit chip. The single integrated circuit chip may reside within the device being charged. The rechargeable battery (or batteries) reside(s) within the device. The device may comprise an interface for coupling to a battery charger. The device may comprise any device that operates on rechargeable batteries, such as the wireless headset previously described.

In a representative embodiment, the charger voltage, $V_{CH}$, may be estimated and not measured, as previously described in the one or more embodiments. For example, if the device is powered by way of a USB (Universal Serial Bus) connector, the charger voltage, $V_{CH}$, may be estimated simply by setting the charger voltage, $V_{CH}$, equal to 5 volts (i.e., the USB $V_{BUS}$ voltage), thereby obviating the need for the charger voltage monitoring circuitry previously described. Thus, use of the charger voltage monitoring circuitry 116 may be optional. The aforementioned device may comprise a headset such as a wireless Bluetooth headset, for example. The estimated voltage may be stored in the memory 132 for use by the decision circuitry 128.

Figure 2:
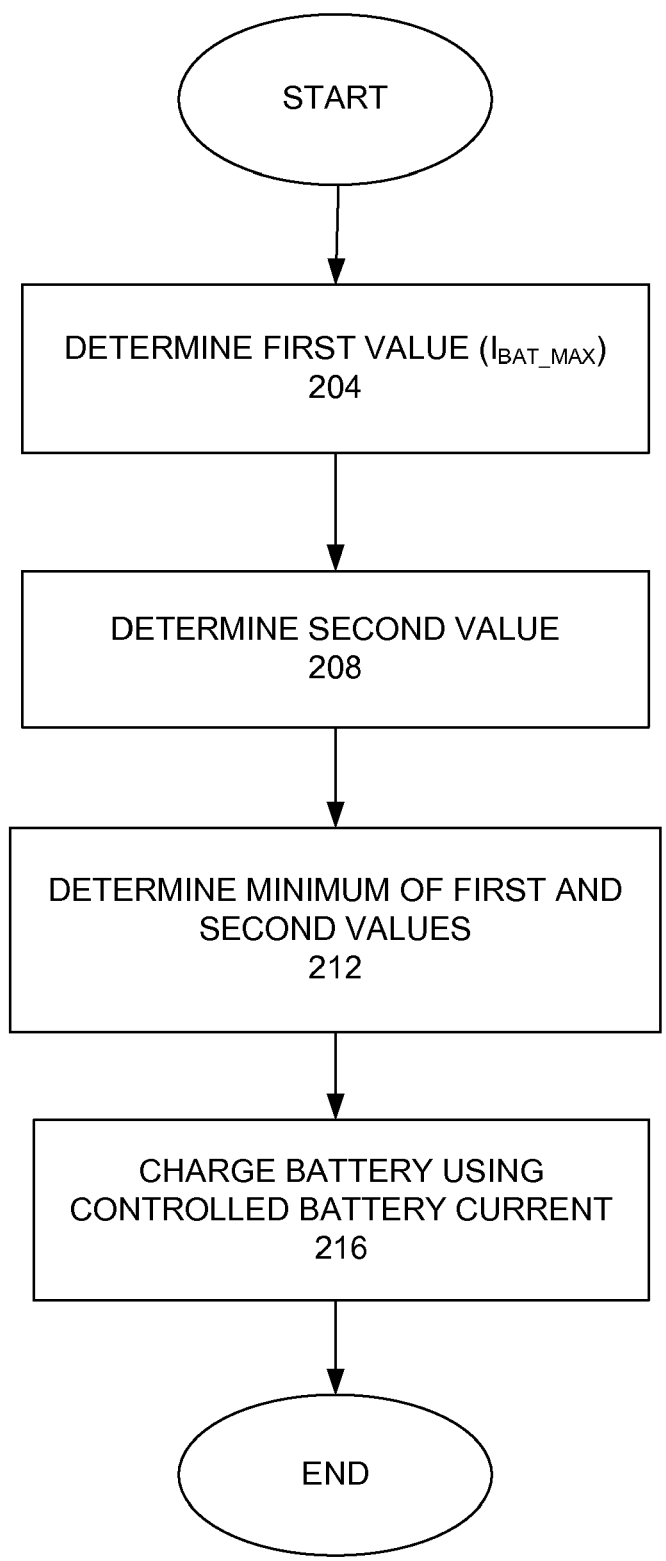
FIG. 2 is an operational flow diagram of a method of controlling the power dissipated by a device while the device's battery is being charged, in accordance with an embodiment of the invention.

FIG. 2 is an operational flow diagram of a method of controlling the power dissipated by a device while the device's battery is being charged, in accordance with an embodiment of the invention. The process starts at step 204 by determining a first value of current for charging a battery in a device. As previously stated, the device may comprise a wireless device such as a cellular phone, PDA, or wireless headset, for example. In a representative embodiment, the first value is represented by a fixed value or constant, $I_{BAT\_MAX}$, as described previously with respect to FIG. 1. The value for $I_{BAT\_MAX}$ may be chosen or determined by a manufacturer of the device.

Next, at step 208, the process comprises determining a second value of the current for charging the battery in the device which is based on a maximum power dissipation tolerated by the device. In a representative embodiment, the maximum power dissipation tolerated by the device is represented by the fixed value or constant, $P_{MAX}$, as described previously with respect to FIG. 1. In a representative embodiment, the maximum power dissipation tolerated by the device may be chosen or determined by a manufacturer of the device.

Next, at step 212, the process continues by determining a minimum of the first and the second values of current, which will be used to charge the battery over the charge cycle. For example, a minimum of $I_{BAT\_MAX}$ and $P_{MAX}$ is determined by taking the minimum of a first value, $I_{BAT\_MAX}$, and a second value, $P_{MAX}/(V_{CH}-V_{BAT})$, as previously described in the equation for $I_{BAT}$ (i.e., $I_{BAT}=MIN(I_{BAT\_MAX}, P_{MAX}/(V_{CH}-V_{BAT}))$. While $P_{MAX}$ and $V_{CH}$ may be constant values, $P_{MAX}/(V_{CH}-V_{BAT})$ will vary as a function of time as $V_{BAT}$ increases in value while charging a battery during a charge cycle. The second value is computed by dividing the maximum power dissipation tolerated by the device, $P_{MAX}$, by a difference between the voltage measured at the charging device, $V_{CH}$, and the voltage taken at the battery, $V_{BAT}$.

Thereafter, at step 216, the battery is charged by way of receiving the controlled battery current from the charger, as defined by the equation, $I_{BAT}=MIN(I_{BAT\_MAX}, P_{MAX}/(V_{CH}-V_{BAT}))$. The value of $I_{BAT}$ varies as a function of time.

In a representative embodiment, the first value corresponds to the value of current during a constant current phase of a typical charge cycle of a device. Alternatively, in a representative embodiment, the first value equals the maximum current during a typical charge cycle of the device.

Figure 3:
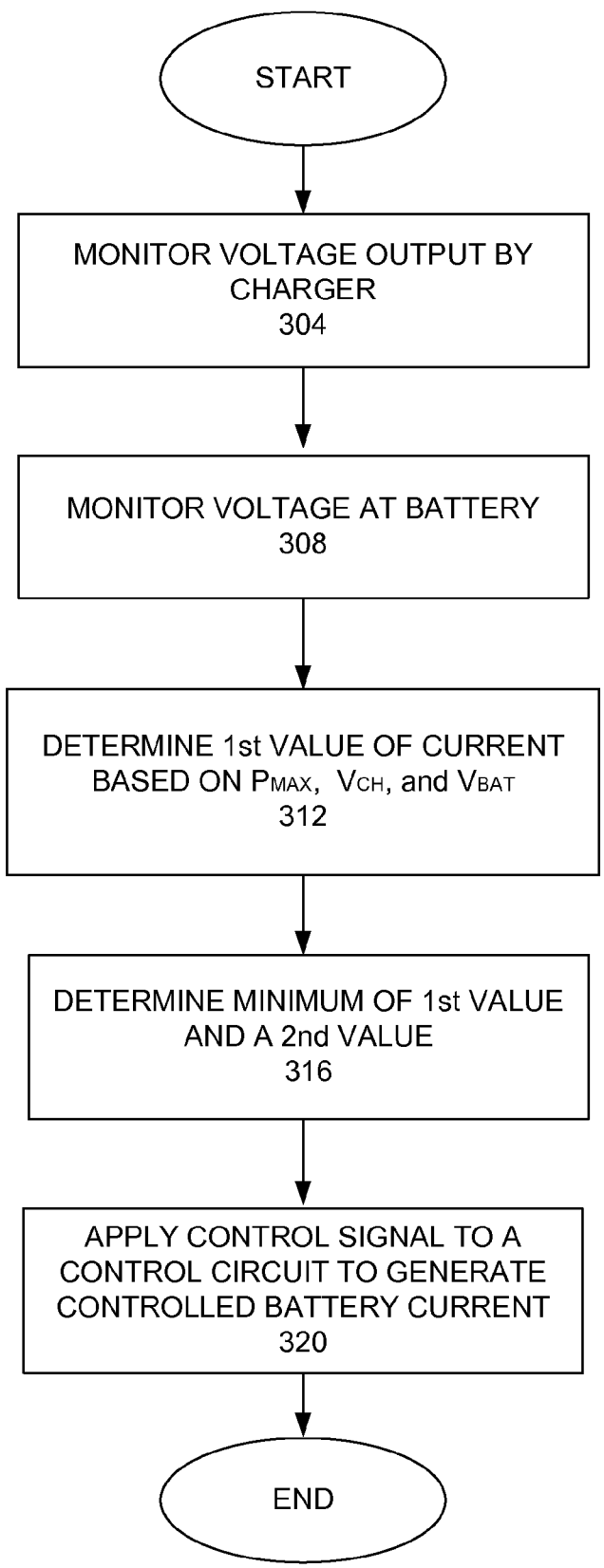
FIG. 3 is an operational flow diagram of a method of controlling the power dissipated from a device while charging a battery inside the device, in accordance with an embodiment of the invention.

FIG. 3 is an operational flow diagram of a method of controlling the power dissipated from a device while charging a battery inside the device, in accordance with an embodiment of the invention. The method commences at step 304, in which the voltage output by a charger of the device is monitored. The charger may provide 5 to 6 volts, for example. Next, at step 308, the voltage at the battery is monitored. At step 312, a first current is determined based on a power dissipation value tolerated by the device, $P_{MAX}$, the voltage output by the charger, $V_{CH}$, and the voltage at the battery, $V_{BAT}$. Next, at step 316, a minimum of the first current and a second current is determined, wherein the second current equals the value of the maximum current during a constant current phase of a typical charge cycle of the device's battery. Alternatively, the second current may equal the maximum value of the charging current during a typical charge cycle of the device's battery. Thereafter, at step 320, a control signal may be applied to a control circuitry, such as the charge control circuitry mentioned with respect to FIG. 1, to generate the controlled battery current, $I_{BAT}$, as previously defined by the controlled battery current equation.

Figure 4A:
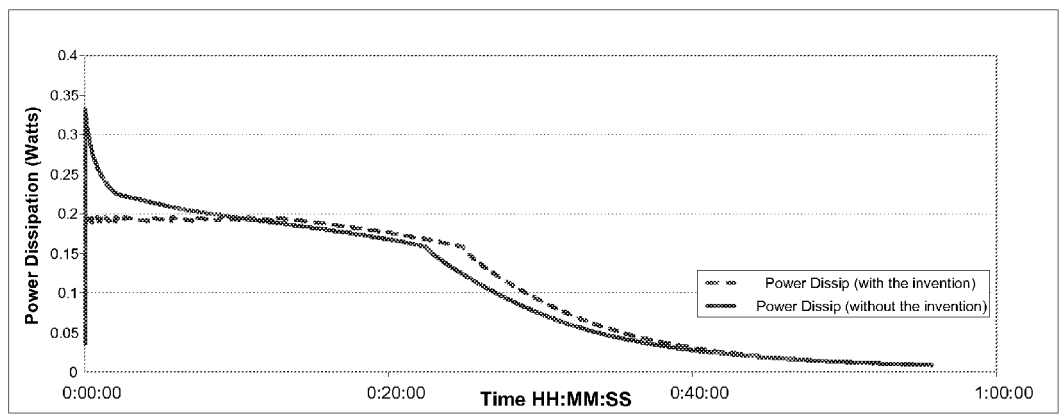
FIG. 4A provides a graph of power dissipation of a device illustrating the benefits and advantages of the invention, in accordance with the embodiments described in FIGS. 1-3.

FIG. 4A provides a graph of power dissipation of a device illustrating the benefits and advantages of the invention, in accordance with the embodiments described in FIGS. 1-3. FIG. 4A provides two plots of power dissipation against time. The first plot (solid line) represents power dissipation against time when the invention is not implemented in the device. The second plot (dotted line) represents power dissipation against time when the invention is implemented into the device. As illustrated in FIG. 4A, power dissipation is at a high level within the first few minutes without use of the invention. However, when the various aspects of the invention are utilized, the power dissipation is controlled such that power dissipation does not exceed approximately 0.2 Watts (which corresponds to $P_{MAX}$) as illustrated in this exemplary graph. Furthermore, when the invention is employed, the time it takes to charge the battery is less than what it would take without employing the invention.

Figure 4B:
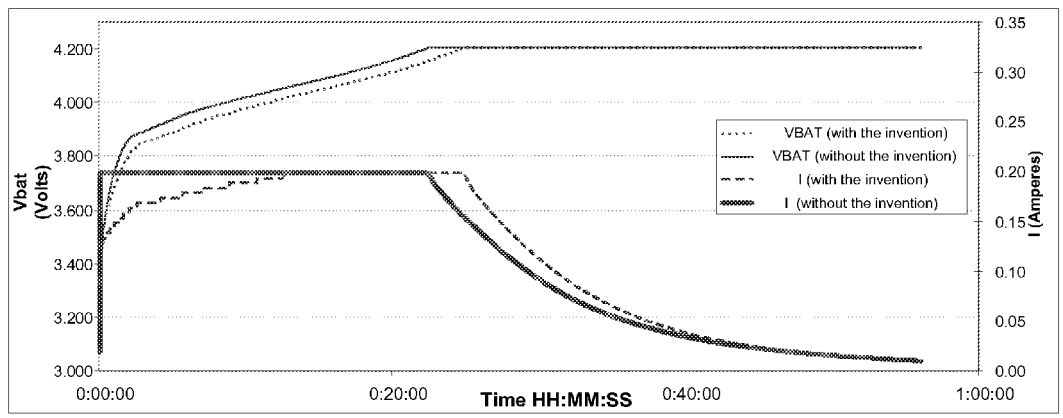
FIG. 4B provides a graph of battery voltage and current as a function of time with and without use of the present invention.

FIG. 4B provides a graph of battery voltage and current as a function of time with and without use of the invention. When the various aspects of the invention are implemented, the current provided to the battery (dotted line) is gradually increased as $V_{BAT}$ is increased, thereby providing controlled power dissipation, as previously shown in FIG. 4A. Without the invention, as when using a typical linear charging method, the current attains the maximum constant current value faster (in the constant current phase of the charge cycle), thereby generating a higher power dissipation. The maximum current value is $I_{BAT\_MAX}$. When the invention is employed, the duration of the constant current phase is longer; however, the overall charge time is slightly reduced, which may be seen as the current decays to zero faster. FIG. 4B also displays the battery voltage, $V_{BAT}$, during the battery charging process. In comparison to the typical case when the invention is not used, the constant voltage phase (i.e., after the constant current phase) is reached slightly later when the invention is employed, as shown in the upper portion of the graph of FIG. 4B. Furthermore, when the invention is employed, the battery voltage (shown as dotted line) is slightly lower in value in comparison to what it would be if the invention were not employed over the constant current phase of the charge cycle. Thus, by controlling the current during the constant current phase, the power dissipated (i.e., heat dissipated) from the device is significantly reduced.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A system for controlling the power dissipated by a device when charging a battery in said device comprising:
   one or more circuits operable for, at least:
   first determining a first value of a current, said first value based on a maximum power capable of being dissipated by said device, said device powered by said battery;
   second determining a minimum of said first value and a second value, wherein said first value is a function of time, said first value computed by dividing said maximum power by a difference between a first voltage measured at a supply terminal of a charging device and a second voltage taken at an input terminal of said battery; and
   receiving a current for charging said battery using said minimum, said charging device performing said charging.

2. The system of claim 1 wherein said maximum power equals a maximum power tolerated by said device.

3. The system of claim 1 wherein said second value equals a maximum value of current found within a constant current phase of a typical charge cycle of said device.

4. The system of claim 1 wherein said second value equals a maximum current attained while charging said battery using said charging device.

5. The system of claim 1 wherein said maximum power is specified by a manufacturer of said device.

6. The system of claim 1 wherein said device comprises a wireless headset.

7. The system of claim 1 wherein said second value and a value of said maximum power are stored in a memory within said device.

8. The system of claim 1 wherein said battery comprises a lithium-polymer battery.

9. The system of claim 1 wherein said battery comprises a lithium-ion battery.

10. A system for controlling the power dissipated by a device when charging a battery in said device comprising:
one or more circuits operable for, at least:
computing a difference between a first voltage and a second voltage, said first voltage generated by a charger for charging said device, said second voltage corresponding to a voltage across said battery;
said charger providing current to charge said battery; and
generating a controlled battery current, wherein said controlled battery current is equal to a minimum of a first value and a second value, said first value equal to a maximum value of current during a typical charge cycle of said battery divided by said difference, said second value equal to a maximum power dissipation tolerated by said device.

11. The system of claim 10 wherein said maximum power dissipation tolerated by said device is specified by a manufacturer of said device.

12. The system of claim 10 wherein said device comprises a wireless headset.

13. The system of claim 10 wherein said second value and a value of said maximum power dissipation are stored in a memory of said device.

14. The system of claim 10 wherein said battery comprises a lithium-polymer battery.

15. The system of claim 10 wherein said battery comprises a lithium-ion battery.

16. A method of controlling the power dissipated by a device when charging a battery in said device comprising:
first monitoring a first voltage output by a charger used for said charging said battery;
second monitoring a second voltage at said battery;
first determining a first current based on a power dissipation value associated with said device, said first voltage, and said second voltage;
second determining a minimum of said first current and a second current, wherein said second current equals a maximum charging current during a typical charge cycle of said device; and
applying a control signal to a control circuit to generate said minimum, said control circuit communicatively coupled to:
said charger at a first port, and
said battery at a second port.

17. The method of claim 16 wherein said device comprises a wireless headset.

18. The method of claim 16 wherein said battery comprises a lithium battery.

19. A system for controlling the power dissipated by a device when charging a battery in said device comprising:
one or more circuits operable for, at least:
first monitoring a first voltage output by a charger used for said charging said battery;
second monitoring a second voltage at said battery;
first determining a first current based on a power dissipation value associated with said device, said first voltage, and said second voltage;
second determining a minimum of said first current and a second current, wherein said second current equals a maximum charging current during a typical charge cycle of said device; and
applying a control signal to a control circuit of said one or more circuits to generate said minimum, said control circuit communicatively coupled to:
said charger at a first port, and
said battery at a second port.

20. The system of claim 19 wherein said device comprises a wireless headset.

21. The system of claim 19 wherein said battery comprises a lithium battery.

22. A method of controlling the power dissipated by a device when charging a battery in said device comprising:
monitoring a battery voltage of said battery;
first determining a first current based on a power dissipation value associated with said device, said battery voltage, and an estimated voltage;
second determining a minimum of said first current and a second current, wherein said second current equals a maximum charging current during a typical charge cycle of said device; and
applying a control signal to a control circuit to generate said minimum, said control circuit communicatively coupled to:
a charger at a first port, and
said battery at a second port.

23. The method of claim 22 wherein said charger powers said battery using a USB (Universal Serial Bus) connector.

24. The method of claim 23 wherein said estimated voltage is 5 volts.

25. The method of claim 22 wherein said first current is determined by dividing said power dissipation value by a difference between said estimated voltage and said battery voltage.

26. The method of claim 22 wherein said estimated voltage, said power dissipation value, and said maximum charging current are stored in a memory of said device.

27. A system for controlling the power dissipated by a device when charging a battery in said device, said system comprising:
monitoring a battery voltage of said battery;
first determining a first current based on a power dissipation value associated with said device, said battery voltage, and an estimated voltage output by a charger;
second determining a minimum of said first current and a second current, wherein said second current equals a maximum charging current during a typical charge cycle of said device; and
applying a control signal to a control circuit to generate said minimum, said control circuit communicatively coupled to:
said charger at a first port, and
said battery at a second port.

28. The system of claim 27 wherein said charger powers said battery using a USB (Universal Serial Bus) connector.

29. The system of claim 28 wherein said estimated voltage is 5 volts.

30. The method of claim 28 wherein said estimated voltage, said power dissipation value, and said maximum charging current are stored in a memory of said device.

31. The system of claim 27 wherein said first current is determined by dividing said power dissipation value by a difference between said estimated voltage and said battery voltage.

* * * * *

UNITED STATES PATENT AND TRADEMARK OFFICE
CERTIFICATE OF CORRECTION

| | | |
|---|---|---|
| PATENT NO. | : 8,084,999 B2 | Page 1 of 1 |
| APPLICATION NO. | : 12/476695 | |
| DATED | : December 27, 2011 | |
| INVENTOR(S) | : Esnard et al. | |

It is certified that error appears in the above-identified patent and that said Letters Patent is hereby corrected as shown below:

Column 9, line 5, please replace "method" with "system".

Signed and Sealed this
Seventeenth Day of April, 2012

David J. Kappos
*Director of the United States Patent and Trademark Office*